United States Patent [19]

Takeshima et al.

[11] Patent Number: 4,552,240
[45] Date of Patent: Nov. 12, 1985

[54] POWER STEERING APPARATUS

[75] Inventors: Sadao Takeshima; Takeshi Ohe, both of Saitama, Japan

[73] Assignee: Jidosha Kiki Co., Ltd., Tokyo, Japan

[21] Appl. No.: 577,278

[22] Filed: Feb. 6, 1984

[30] Foreign Application Priority Data

Feb. 14, 1983 [JP] Japan ................... 58-22551

[51] Int. Cl.⁴ ............................................. B62D 5/06
[52] U.S. Cl. .................................................. 180/142
[58] Field of Search ....................... 180/141, 142, 133

[56] References Cited

U.S. PATENT DOCUMENTS

| 4,392,540 | 7/1983 | Michio | 180/142 |
| 4,396,083 | 8/1983 | Wehberg | 180/142 |
| 4,453,615 | 6/1984 | Kanazawa | 180/142 |
| 4,499,964 | 2/1985 | Abe | 180/142 |

OTHER PUBLICATIONS

French Patent Publication No. 2323564-4/77.

Primary Examiner—Douglas Hart
Attorney, Agent, or Firm—Blakely, Sokoloff, Taylor & Zafman

[57] ABSTRACT

In a power steering apparatus for use in a motor car of the type including a control device for controlling a motor driven oil pump in accordance with the output of a sensors which detects the running condition of the motor car driven by an engine, there is provided a control system which stops the oil pump while the engine is being stopped and also stops the oil pump at the time of starting the engine.

15 Claims, 9 Drawing Figures

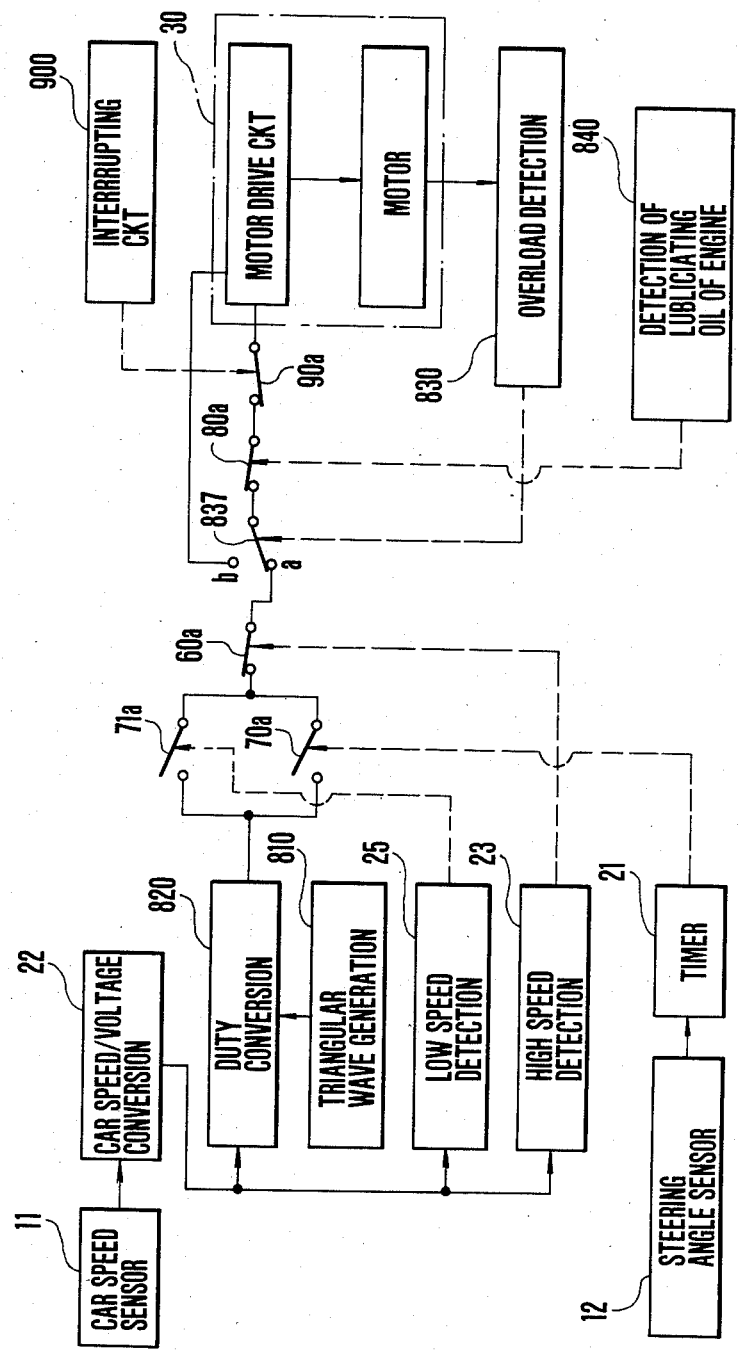

POWER STEERING APPARATUS

BACKGROUND OF THE INVENTION

This invention relates to a power steering apparatus mounted on various motor cars for decreasing steering force required for the driver.

In recent years, as steering apparatus of a motor car has been used power steering apparatus for the purpose of rapidly and smoothly steering the car, thus decreasing fatigue of the driver. According to such power steering device, an oil pump is driven by an internal combustion engine or an electric motor and the quantity of oil supplied to the power steering apparatus is controlled in accordance with the running conditions of the car so as to effect light and stable steering from a low speed running to a high speed running.

In such prior art power steering apparatus, however, the oil pump is constantly operated for the purpose of lightly operating the steering apparatus so that the power supplied to the oil pump is consumed in vain when the steering is not made. For this reason, as disclosed in German Laid Open Patent Specification No. 2,640,988, it has been proposed a method wherein the oil pump is operated only at the time of steering. With this method, however, each time the steering is made, the oil pump is operated so that even when the engine is stopped, steering causes the oil pump to operate whereby the battery mounted on the motor car would discharge excessively which often makes it difficult to start the engine.

SUMMARY OF THE INVENTION

Accordingly, it is an object of this invention to provide an improved power steering apparatus, which not only saves the power consumption but also does not make it difficult to start the engine.

Another object of this invention is to provide a novel power steering apparatus of a motor car capable of preventing excessive discharge of a battery mounted on the motor car.

According to this invention there is provided a power steering apparatus for use in a motor car of the type including a control means for controlling a motor driven oil pump in accordance with the output of a sensor which detects running condition of the motor car driven by an engine, characterized in that there are provided means for stopping the oil pump while the engine is being stopped and means for stopping the oil pump at the time of starting the engine.

BRIEF DESCRIPTION OF THE DRAWINGS

Further objects and advantages of the invention can be more fully understood from the following detailed description taken in conjunction with the accompanying drawings in which:

FIGS. 7 and 8 are connection diagrams showing examples of interrupting circuits and FIG. 9 is a block diagram showing a combination the embodiments shown in FIGS. 4, 5, 7 and 8.

DESCRIPTION OF THE PREFERRED EMBODIMENTS

Figure 1:
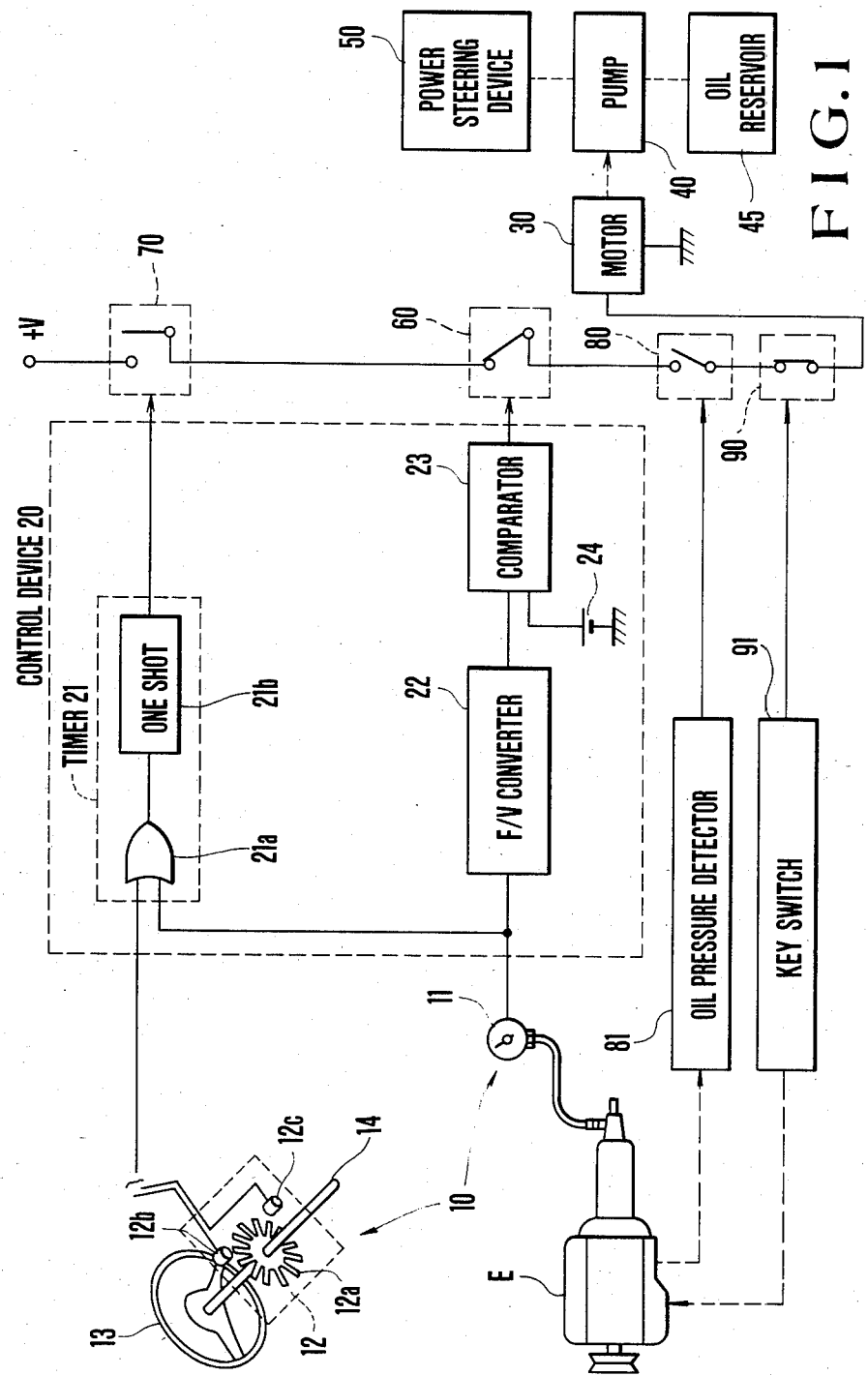
FIG. 1 is a block diagram showing one embodiment of this invention.

The power steering apparatus embodying the invention and shown in FIG. 1 comprises a sensor device 10 which detects the running condition of a motor car. The sensor device 10 is constituted by a speed sensor 11 mounted on an engine E or a wheel of the motor car to produce a speed signal of pulse numbers corresponding to the car speed, and a steering angle sensor 12 which generates a steering signal of pulse numbers corresponding to a steering angle of a steering wheel. The speed sensor 11 may be of a well known type, for example of a digital speed meter or a sensor that generates a speed signal of pulse numbers corresponding to the car speed. The steering angle sensor 12 comprises a code disc 12a secured to a steering shaft 14 of the steering wheel 13 and provided with a plurality of slots equally spaced and a light projector or a light emitting element 12b and a light receiver 12c on the opposite sides of the code disc 12a. When the steering shaft 14 is rotated the light emitted from the light projector 12a and received by the light receiver 12c is interrupted so as to produce a steering signal of the pulse numbers corresponding to the steering angle. The speed signal and the steering signal respectively generated by the speed sensor 11 and the steering angle sensor 12 are supplied to a control device 20 to be described later.

The control device 20 is constituted by a timer 21 which, when supplied with the car speed signal and the steering signal, produces a first switch control signal lasting for a predetermined time, a frequency/voltage (F/V) converter 22 which is response to the car speed signal provided from the speed sensor 11 produces a DC output voltage proportional to the pulse repetition numbers (pulse frequency) and a comparator 23 comparing the DC voltage outputted by the F/V converter 22 with a reference value 24 from a source of reference signal 24.

The timer 21 comprises an OR gate circuit 21a supplied with the car speed signal and the steering signal and a one-shot circuit 21b which produces a first control signal of a high level, for example, while it is supplied with the output of the OR gate circuit 21a.

The power steering apparatus shown in FIG. 1 further comprises an oil pump 40 driven by an electric motor 30, an oil reservoir 45, a power steering device 50 actuated by the oil pump 40, a switch 60 which is driven by the output of the comparator 23 and held closed while the car is stopped, a switch 70 driven by the output of the timer 21 and held open while the car is stopped, a switch 80 adapted to stop the oil pump 40 during engine stop, and a switch 90 for stopping the pump 40 at the time of starting the engine E. The switch 80 is driven, for example, by a signal from an oil pressure detector 81 that detects pressure drop of lubricating oil of the engine E during engine stop. The switch 90 is normally closed and opened when a key switch 91 is manually set at the starting position for starting the engine E.

The apparatus described above operates as follows.

Since the switch 80 is OFF during engine stop, the motor 30 is not energized so that even when steering is made the motor 30 is not energized and hence the pump 40 is not driven. On the other hand, since the switch 90 is OFF at the time of starting the engine E, the motor 30 and the pump 40 would not be operated. When the engine E is started by operating the key switch 91, the pressure of the lubricating oil of the engine E rises so that the switch 80 will become ON. When the key switch 91 is released from the starting position, the switch 90 returns to its ON position shown in FIG. 1. As a consequence, upon completion of the starting operation, both switches 80 and 90 become ON.

At this time the starting operation completes and the car can run at any time. The operation during car stop will firstly be described. While the car is stopping and no steering is made, both the car speed sensor 11 and the steering angle sensor 12 do not produce any signal so that the timer 21 does not produce any pump driving signal. Accordingly the switch 70 is OFF and the motor 30 is not driven. At this time when the driver performs a steering operation, the steering angle sensor 12 generates a steering angle signal which is supplied to the timer 21. Thus, the timer 21 produces a first control signal as a pump driving signal, so as to close switch 70. Since at this time switches 60, 80 and 90 are ON the motor 30 is connected to a source of drive, a battery for example, to start rotation.

As the motor car starts to run, the car speed sensor 11 generates a car speed signal which is supplied to the timer 21 so as to cause it to generate a motor driving signal irrespective of the steering operation, thus closing switch 70. At this time, the car speed signal is also supplied to F/V converter 22 so that it produces a DC voltage corresponding to the car speed signal. However, unless the car speed signal exceeds a predetermined value, the comparator 23 does not produce a second control signal, that is a motor interruption signal so that the switch 60 is maintained ON while the car speed signal is less than a predetermined value. As a consequence, the motor 30 will be energized continuously.

When the running speed of the motor car exceeds a predetermined value, the voltage supplied to the comparator circuit 23 from the F/V converter 22 exceeds a predetermined value with the result that the comparator circuit 23 generates the second control signal. Thus the switch 60 is opened to deenergize the motor 30.

As above described, the motor 30 is stopped while the engine is not operating, when the engine E is started, or when the car is stopped and no steering operation is made, whereas the motor 30 is driven when the steering operation is made while the car is stopping, or when the car speed is less than a predetermined speed during running. But when the car speed is above the predetermined car speed, the motor 30 would be stopped irrespective of the steering operation. For this reason, during the car stop or when the car runs at a low speed less than the predetermined car speed the motor 30 is energized to actuate the power steering device 50 thus enabling light and smooth steering. When the car runs above the predetermined car speed, the motor 30 is also stopped to deenergize the power steering device 50. However, when the car speed is high, the steering wheel can be rotated with a small force so that even when the power steering device 50 is not actuated.

Since the motor 30 is rotated only when the engine E is operating and the power steering is necessary, it is not only possible to prevent excessive discharge of the battery but also to prevent useless power consumption.

The above described operations can be summarized as shown by the following Table I.

TABLE I

| | Output of Steering angle sensor 12 | Output of car speed sensor 11 | State of switch 70 | State of switch 60 | Motor 30 |
| --- | --- | --- | --- | --- | --- |
| stop | no | no | off | on | off |
| steering during stop | yes | no | on | on | on |
| low speed running | no or yes | yes | on | on | on |
| high speed running | no or yes | yes | on | off | off |

Figure 2:
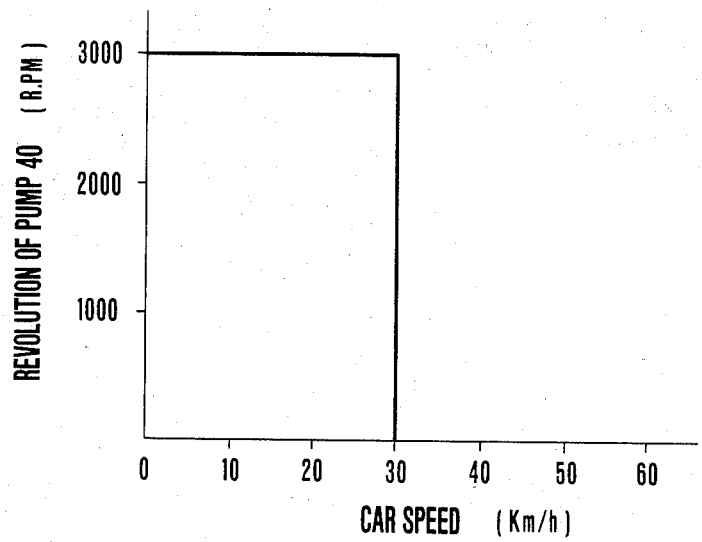
FIG. 2 is a graph showing the relationship between the car speed and the revolution of an oil pump.

The relationship between the car speed and the revolution of the pump 40 is shown in FIG. 2.

The steering angle signal can be produced by the steering angle sensor 12 by sensing the angle of rotation of the steering wheel 13. This signal can also be produced by detecting the torque applied to the steering shaft 14 with a steering torque sensor, not shown. Furthermore, the timer 21 may be constituted by a F/V converter and a comparator. Instead of ON/OFF controlling the motor 30, the engine power can be transmitted to or interrupted from the oil pump by ON/OFF controlling an electromagnetic clutch.

Figure 3:
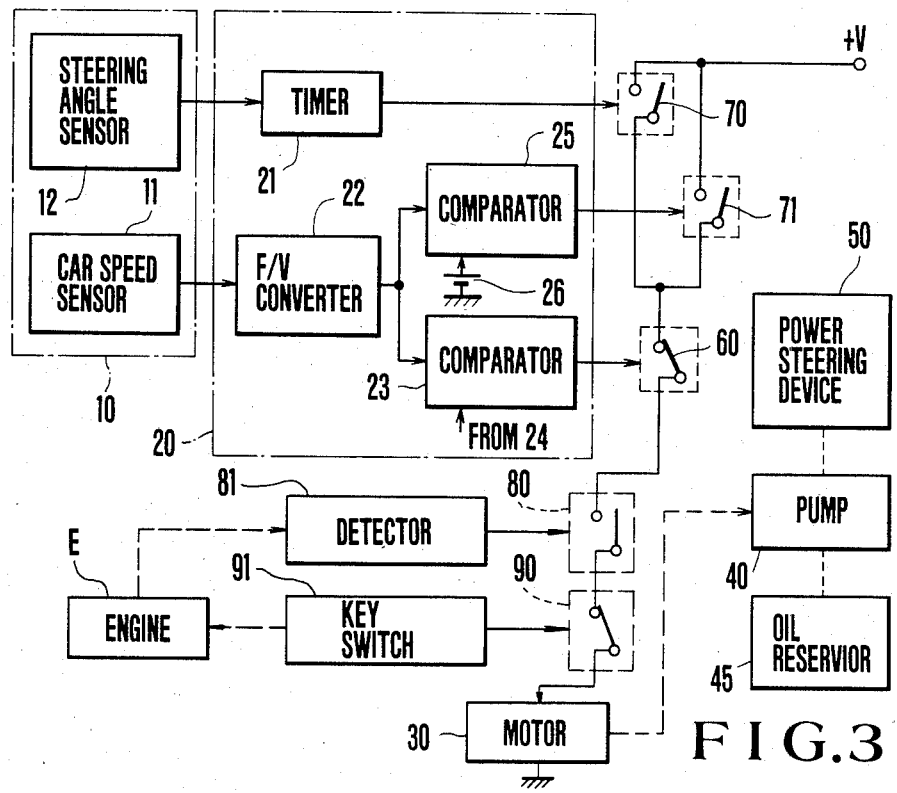
FIGS. 3 and 4 are block diagrams showing other embodiments of this invention.

In the modified embodiment shown in FIG. 3, elements corresponding to those shown in FIG. 1 are designated by the same reference numerals. Comparator 25 shown in FIG. 3 has the same construction as the comparator 23 shown in FIG. 1, but operates such that is would not produce a third control signal that drives the motor 30 in a range in which the car speed is less than an output of a reference signal source 26, that is the second predetermined speed such as several km/h for example (hereinafter, this region is termed an extremely low speed region) whereas when the car speed exceeds the second predetermined speed the comparator 25 produces a motor drive control signal. On the other hand, the comparator 23 generates the second control signal that deenergizes the motor 30 when the car speed becomes a region above the first predetermined speed (hereinafter, this region is termed a high speed region). The first predetermined speed is higher than the second predetermined speed and a region between the first and second predetermined speed is herein defined as a low speed region. A switch 71 is provided which is closed by a third control signal from the comparator 25 only when the car speed is higher than the second predetermined speed.

The apparatus shown in FIG. 3 operates as follows. In the same manner as in FIG. 1, the motor 30 is not operated since either one of the switches 80 and 90 is opened when the engine E is not operating or the engine E is being started. When the engine E is operating but the car does not run, since the car speed sensor 11 does not generate a car speed signal, F/V converter 22, and comparators 25 and 23 do not operate so that the switch 71 is OFF and the switch 60 is ON. At this time steering operation is not made, since the steering angle sensor 12 does not generate a steering signal so that the timer 21 does ot operate, thus maintaining the switch 70 in its OFF state. Consequently, the motor 30 would not be energized. When steering operation is made under these state, the steering angle sensor 12 sends a steering signal to the timer 21 so as to cause it to generate a motor driving signal, whereby the switch 70 is closed. At this time since switches 60, 80 and 90 are ON, the motor 30 is engergized.

As the motor car starts to run, the car speed sensor 11 generates a car speed signal which is converted into DC voltage by the F/V converter 22 and then supplied to the comparators 23 and 25. At this time, when the car speed lies in the extremely low speed range, both comparators 23 and 25 do not operate so that the switch 60 is ON and the switch 71 is OFF. At this time when steering operation is not made, the switch 70 is also OFF and the motor 30 would not be energized. However, when steering, operation is made the switch 70 is closed so that the motor 30 starts to run.

When the car speed exceeds the extremely low speed range, the comparator 25 generates the motor driving signal to close the switch 71. Thus, the motor 30 is started irrespective of the steering operation.

As the car speed increases further to reach the high speed range, the comparator 23 generates a second control signal as a motor interruption signal so that switch 60 is opened to stop the motor 30. At this time, although the switch 70 is being closed due to steering, as the switch 60 is OFF, the motor 30 would not be energized.

As a consequence in the extremely low speed range including car stop, the motor 30 is stopped except at the time of steering, whereas in a low speed range between the extremely low speed range and the high speed range, the motor 30 is always operated, and in high speed range, the motor 30 is stopped irrespective of the steering operation. For this reason, in the low speed range including car stop, when steering is made power steering operation is made, thus permitting light and smooth steering. Although in the high speed range, the power steering is not made but light and smooth steering can be made due to decrease in the steering power. Thus, in the low speed range, although the motor 30 is always operated for the purpose of preventing a response delay at the time of rapid steering effected to avoid danger, the motor 30 is stopped except in the extremely low speed range and at the time of car stop at which response delay does not cause any trouble. The motor 30 is also stopped in the high speed range in which power steering is not necessary so as to permit light and smooth steering and decrease in the electric power consumption than the prior art power steering apparatus.

In the same manner as in the first embodiment, it should be understood that the steering angle signal can be detected by the amount of the steering handle rotation, that the steering angle signal may be a signal produced by detecting torque applied to the steering shaft with a steering torque sensor and that the timer 21 can be constituted by a F/V converter and a comparator.

Figure 4:
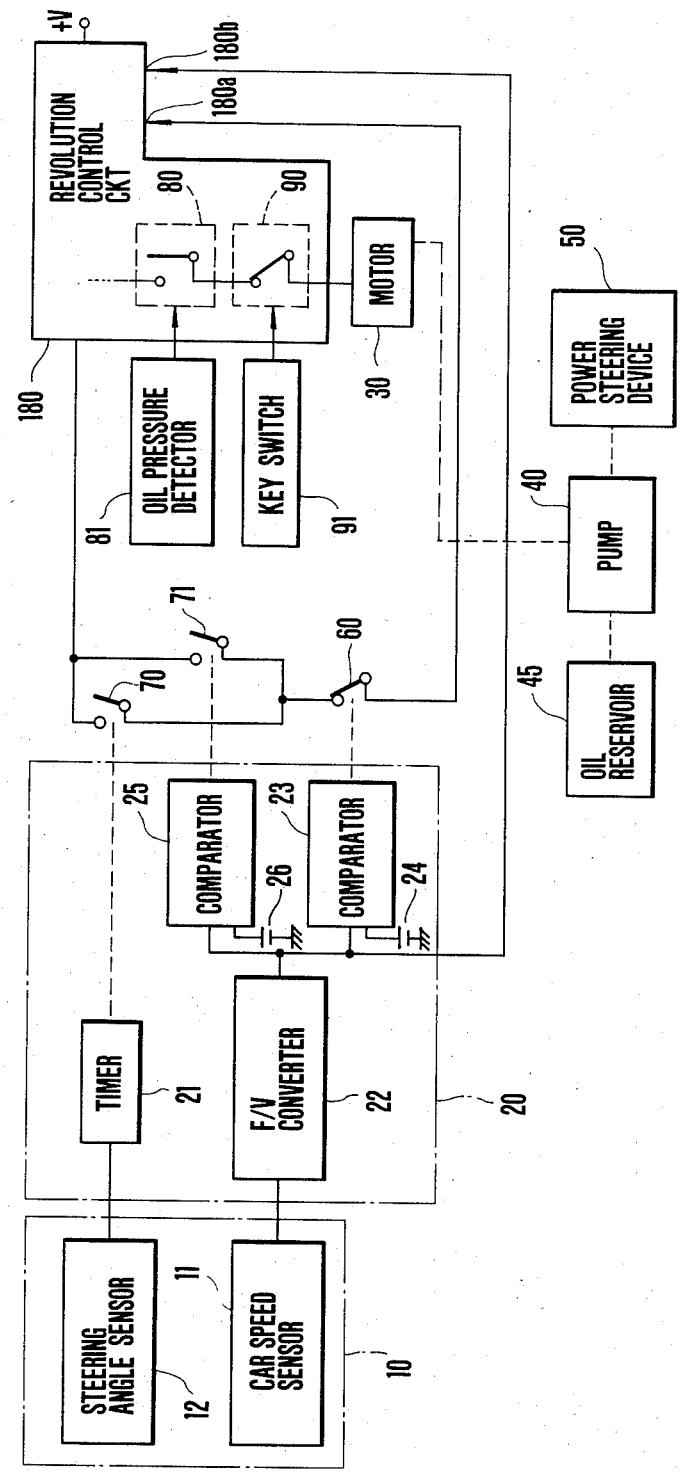

FIG. 4 shows a third embodiment of this invention, in which elements corresponding to those shown in FIGS. 1 and 3 are designated by the same reference numerals. In FIG. 4 reference numeral 100 designates a revolution control circuit which is constructed such that, when a signal is being supplied to its input terminal 180a, the revolution of the motor 30 decreases as the value of a signal applied to an input terminal 180b increases, and that, when the supply of the signal to the input terminal 180a is stopped, the motor 30 is deenergized irrespective of the signal supplied to the input terminal 180a. In the same manner as in FIG. 3, the revolution control circuit 180 is constructed to supply power to the motor 30 through switches 80 and 90.

The modification shown in FIG. 4 operates as follows. Thus, in the same manner as in the first embodiment, the motor 30 is not operated since either one of the switches 80 and 90 is opened while the engine E is stopped or at the time of starting the engine E.

When the car is stopped and the steering wheel is not rotated the switch 70 and 71 is open or OFF so that no signal is applied to the input terminal 180a of the revolution control circuit 180. Consequently, this circuit 180 does not energize the motor 30. When the steering wheel is rotated at this time, the steering angle signal supplied to the timer 21 from the steering angle sensor 12 causes the timer 21 to produce a motor drive signal which closes the switch 70 to supply a signal to the input terminal 180a of the revolution control circuit 180. Consequently, the circuit 180 supplies voltage to the motor 30 to start the same.

While the car is running in the extremely low speed range such as to several km/h for example, both comparators 23 and 25 do not operate so that the switch 70 and 71 are opened and the switch 60 is closed. Thus, in the extremely low speed region, in the same manner as a case of the car stop, the switch 70 is closed only during steering to supply a signal to the input terminal 180a of the revolution control circuit 180, thus driving motor 30.

When the car speed rises to the low speed region, comparator 25 operates to produce a motor drive signal which closes the switch 71 so that a signal is always supplied to the input terminal 180a of the revolution control circuit 180 irrespective of the steering operation. At the same time V/F converter 22 supplies to the input terminal 180b of the revolution control circuit 180a revolution control signal proportional to the car speed. Thus, the revolution control circuit 180 operates to decrease the number of revolutions of the motor 30 as the car speed increases.

As the car speed is further increased to the high speed region, the comparator 23 generates a motor stop signal to open the switch 60, thus interrupting supply of the signal to the input terminal of the revolution control circuit 180, whereby this circuit does not supply voltage +V to the motor 30 to stop the same.

Thus, in the extremely low speed region including car stop, except a case in which the steering operation the motor 30 is not operated, while in the low speed region, the motor 30 is operated irrespective of the steering operation and the revolution of the motor 30 is decreased with increase of the car speed. In the high speed region, the motor 30 is not operated. For this reason, in the extremely low speed region including the car stop, the steering wheel can be rotated with a small force, in the low speed region, an adequate steering can be made in accordance with the car speed, whereas in the high speed region as the steering force is decreased the steering wheel can be rotated smoothly with a small force without relaying upon the power steering. Accordingly it is possible to save the power consumption necessary to drive the oil pump 40.

Just in the same manner as in the first embodiment, the steering angle signal can be produced by detecting the rotation angle of the steering wheel, the steering angle signal can be detected with a torque sensor detecting the torque on the steering shaft, and the timer 21 can be made up of an F/V converter and a comparator.

Figure 5:
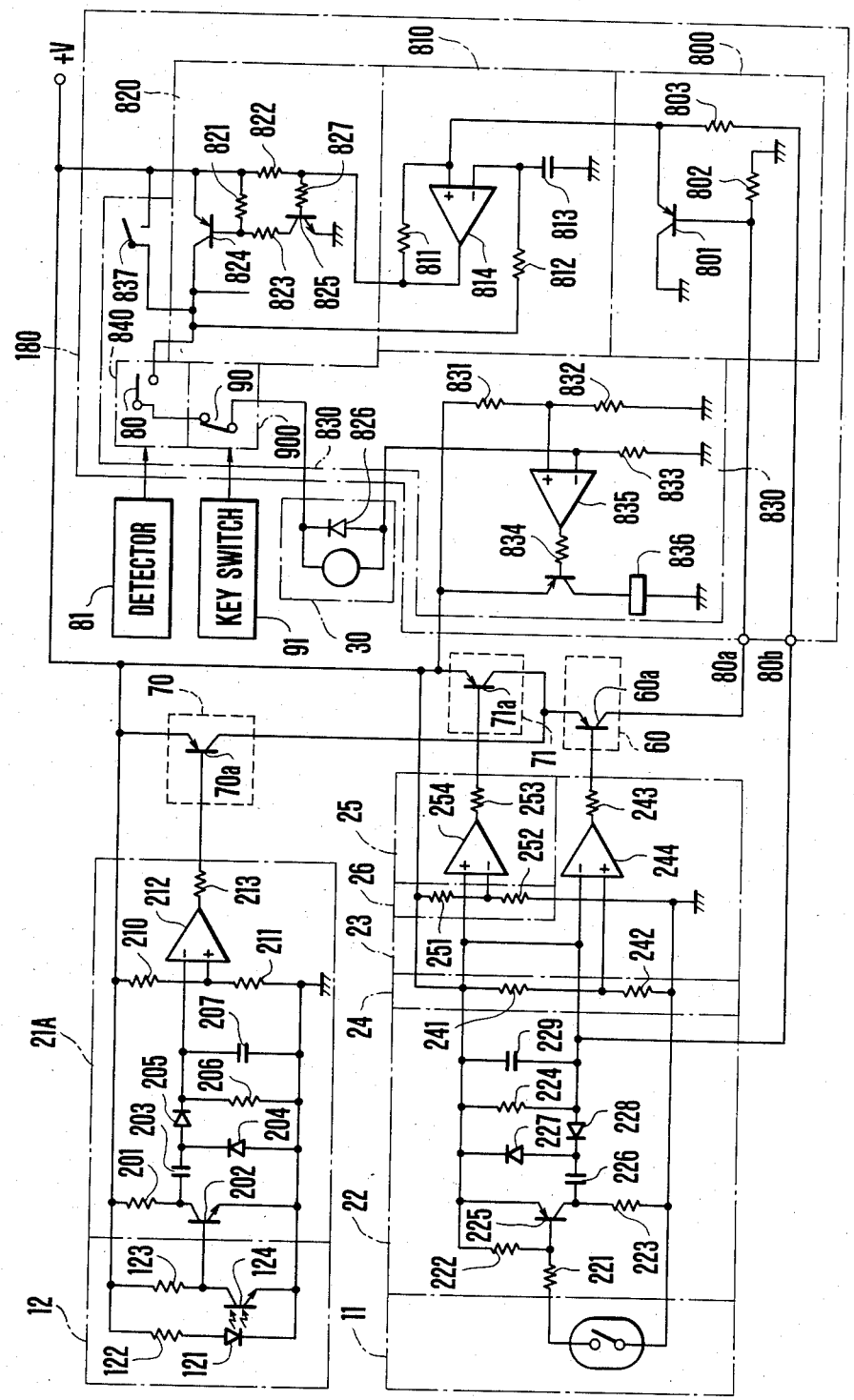
FIG. 5 shows detailed connection of the block diagram shown in FIG. 4.

FIG. 5 shows a connection diagram showing the detail of the embodiment shown in FIG. 4 in which circuit elements corresponding to those shown in FIG. 4 are designated by the same reference numerals. In FIG. 5, the steering angle sensor 12 comprises a light emitting diode 121, resistors 122 and 123, and a phototransistor 124. A rotary disc having a plurality of slots as shown in FIG. 1 is used to control light projected to the phototransistor 124 from the light emitting diode 121 so as to produce a pulse of a number proportional to the steering angle. Block 21A shows a portion corresponding to the timer 21 and constituted by an F/V converter comprising resistors 201, 206, a transistor 202, capacitors 203 and 207, and diodes 204 and 205, and a comparator circuit constituted by resistors 210, 211 and 213 and a comparator 212. The F/V converter converts the steering angle signal into a DC signal proportional to the number of pulses, whereas the output of the comparator circuit changes from "1" to "0" when the voltage of the DC signal exceeds a DC voltage determined by resistors 210 and 211. The F/V converter 22 is constituted by resistor 221, 222, 223 and 224, a transistor 225, a capacitor 226, diodes 227 and 228, and a capacitor 229 so as to convert the car speed signal into DC voltage proportional to the number of pulses.

The comparator circuit 23 is constituted by resistors 241, 242, and 243, and a comparator 244 and operates to produce a motor interruption signal when the output of the comparator 244 changes from "0" to "1" as the output voltage of F/V converter 22 becomes lower than a value determined by resistors 241 and 242. The comparator circuit 25 is constituted by resistors 251, 252 and 253, and a comparator 254. When the output of the F/V converter 22 becomes less than a value determined by resistors 251 and 252, the output of the comparator 254 changes from "1" to "0" so as to produce a motor drive signal. These circuits are constructed such that when the car speed exceeds the first speed, that is the upper limit of the extremely low speed region, the output voltage level of the comparator 254 reverses, and when the car speed exceeds the second speed, that is the upper limit of the low speed region, the output voltage level of the comparator 244 reverses.

In this modification transistors 60a, 70a and 71a operate as switches 60, 70 and 71 respectively.

The revolution control circuit 180 is constituted by a switch circuit 800, a car speed sensing circuit, a voltage regulating circuit 820, an overcurrent protective circuit 830, an interrupting circuit 840 which interrupts the current supplied to the motor 30 when the switch 90 is closed at the time of engine stop, and an interrupting circuit 900 which interrupts the current supplied to the motor 30 when the switch 90 is opened at the time of starting the engine E. Among these circuits, the switch circuit 800 comprises a transistor 801, and resistors 802 and 803. When the signal is supplied to the input terminal 180a, the transistor 801 is turned OFF by a bias voltage produced across the resistor 802, and the signal supplied to the input terminal 180b is supplied to the car speed sensor 801 via resistor 803, whereas, when the signal inputted to the input terminal 180a disappears, the transistor 801 is turned ON to stop supply of the signal to the car speed response circuit 810. The car speed response circuit 810 is constituted by resistors 811, 812 and a capacitor 813 and a comparator 814 for producing a pulse train varying its duty cycle in accordance with the value of voltage supplied to the non-inverting input terminal of the comparator 814. The voltage regulator 820 comprises resistors 821, 822, 823 and 827, transistor 824 and 825 and a diode 826 and operates to supply a high voltage to the motor 30 at the time of a high duty cycle, whereas a low voltage to the motor 30 at the time of a low duty cycle in accordance with the pulse train from the car speed response circuit 810. The overcurrent protective circuit 830 is constituted by resistors 831, 832, 833 and 834, a comparator 835, and a relay 836 with a contact 837, when the motor 30 is overloaded, the relay 836 operates to close its contact 837 so as to short-circuit the transistor 824, thus protecting the same against overcurrent.

For this reason, like FIG. 3, in FIG. 5 the switch 80 or 90 is OFF when the engine E does not operate or at the time of starting the engine so that the motor 30 will not be energized. When the engine E starts and the car runs in the extremely low speed range and steering is not made at this time, transistor 60a is ON, but transistors 70a and 71a are OFF. Consequently, transitor 801 is ON and the non-inverting input terminal of the comparator 814 is grounded. Consequently, the car speed response circuit 810 does not generate a pulse. For this reason, the voltage regulation 820 too does not supply voltage to the motor 30. Under these conditions, where steering is made, transistor 70a is turned ON thus turning OFF transistor 801. As a consequence, the car speed response circuit 810 generates a pulse and the voltage regulatio 820 supplies voltage to the motor 30 to start the same. While the car speed is in the low speed range, the transistor 71a is maintained OFF. Thus motor 30 is operated only during the steering.

As the car speed increases further to reach the low speed range, the transistor 71a is turned ON, thus turning OFF transistor 801. Since a DC voltage proportional to the car speed is supplied to the car speed response circuit 810 from the F/V converter 22, the car speed response circuit 810 produces much number of pulses as the value of supplied DC voltage increases. For this reason, the voltage supplied to motor 30 is decreased as the car speed increases so as to decrease the number of revolutions of the motor 30.

When the car speed increases further to reach the high speed range, transistor 60a is turned OFF and hence transistor 801 is turned ON so that the car speed response circuit 810 stops generation of the pulses. Accordingly, no voltage is supplied to the motor 30, thus stopping the same.

Figure 6:
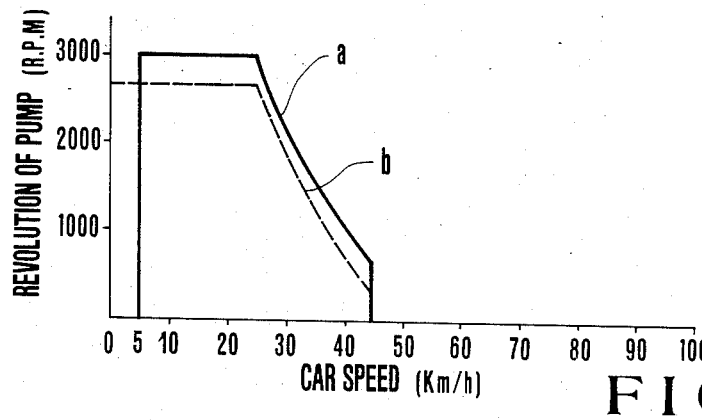
FIG. 6 is a graph showing the relationship between the car speed and the revolution of an oil pump.

The relationship between the car speed and the revolution of the pump 40 is shown in FIG. 6. In this case the reference voltage 26 is determined so that when the car speed is over 5 km/h the comparator 25 outputs the motor drive signal, and the reference voltage 24 is determined so that when the car speed becomes about 45 km/h the comparator 23 outputs the second control signal. The curve a represented by the solid line shows a no-load characteristic when the car runs straight without the steering operation, while the curve b represented by the dotted line a characteristic when the steering is made.

In FIG. 5 when the comparator 23 is eliminated and the switch 60 is short-circuited, even the car is not running the motor 30 would not be operated while the steering wheel is not rotated. But when the steering wheel is rotated the motor 30 is operated and during running the motor 30 is operated irrespective of the steering operation and its speed can be decreased as the car speed increases.

Figure 7:
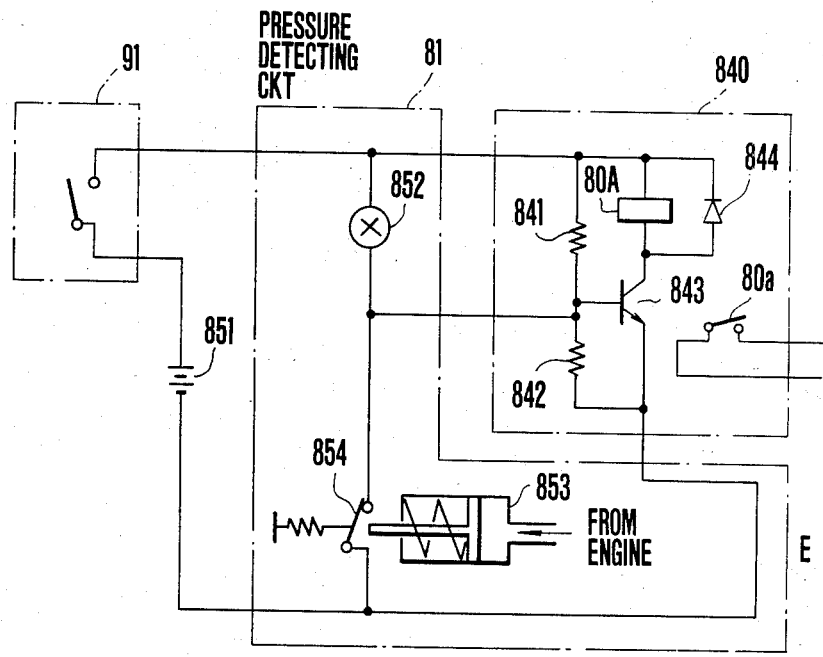

The interrupting circuit 840 is constructed as shown in FIG. 7, for example. Usually, a motor car is provided with a pressure detecting circuit 81 which detects the pressure of the lubricating oil of the engine E. The pressure detecting circuit 81 is constructed such that when the key switch 91 is closed, a lamp 852 is lighted by a current supplied from a battery 851, that as the pressure of the lubricating oil rises, and that the movable member of a switch 854 is pushed by the pressure applied to a cylinder 853 so as to open the switch 854 and extinguish the lamp 852. To this end, where an interrupting circuit 840 is constituted by resistors 841 and 842, a transistor 843, a relay 80A and its contact 80a corresponding to the switch 80 shown in FIG. 4 and a diode 844, when the lubricant pressure is low and the switch 854 is closed, the transistor 843 is turned OFF so that the contact 80a is also open. When the switch 854 is opened as a result of the rise of the lubricant pressure, the transistor 843 is turned ON and the contact 80a is closed.

Figure 8:
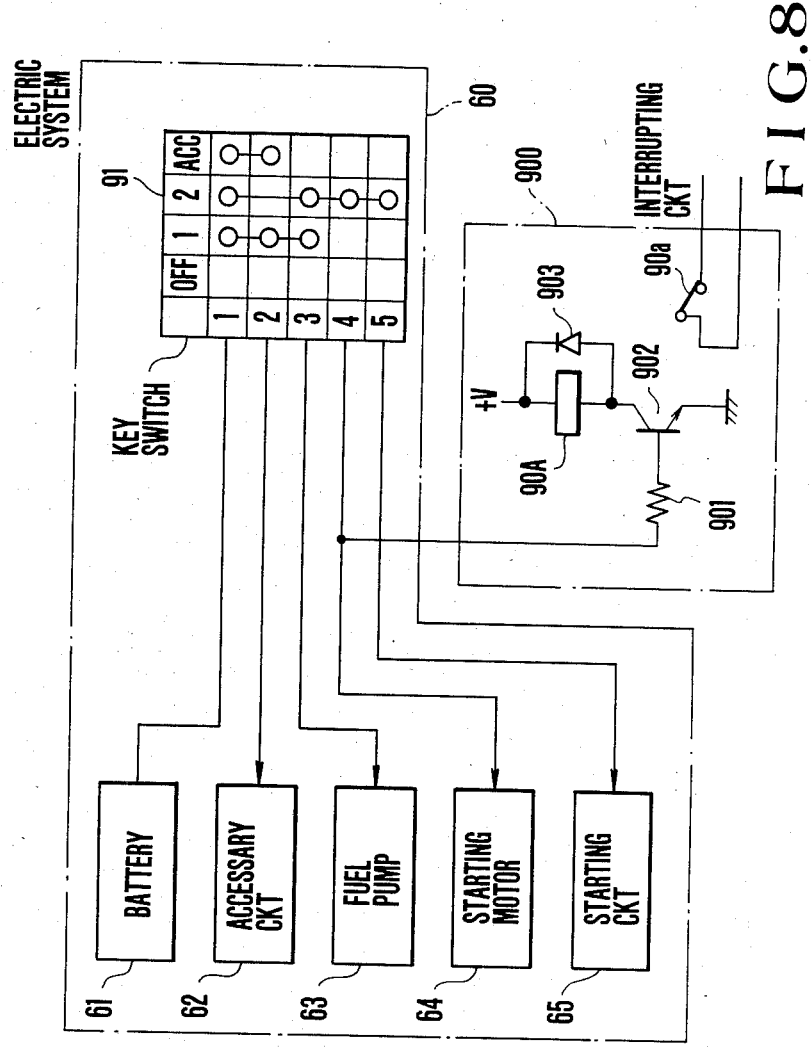

The interrupting circuit 900 is constituted by a resistor 901, a transistor 902, a diode 903, a relay 90A and its contact 90a corresponding to switch 90 shown in FIG. 4, as shown in FIG. 8, for example. An electric system 60 of a motor car generally comprises a battery 61, an accessory circuit 62, a fuel pump 63, a starting motor 64 and a starting circuit 65 which are suitably connected by the key switch 91. Thus, by connecting an interrupting circuit 900 in the source circuit of the starting motor 64 as shown in FIG. 8, transistor 902 is turned ON only at the time of starting to drive a relay 90A. Thus, a contact 90a of the relay 90A is open during starting.

FIG. 9 is a block diagram showing a combination of FIGS. 4 through 8 in which the switch 837 controls the revolution at position a and provides a continuous constant speed operation at position b.

Although in the foregoing embodiments interrupting circuits 840 and 900 were connected in series with the motor 3, the same function can be provided by ON-/OFF controlling the control voltages of the voltage regulating circuit (duty converter) 820. The interrupting circuit 900 may detect the presence or absence of the voltage supplied to the accessory circuit 62. Further these inerrupting circuits 840 and 900 may be arranged on the electric path from the input terminal 180a to the switch circuit 800 in FIG. 6.

As above described, since the power steering apparatus of this invention prohibits the operation of the oil pump while the engine is stopped in which the battery is not charged and when the engine is started, the motor driving the oil pump would not be energized even when the steering is made. Accordingly, excessive discharge of the storage battery can be prevented so that there is no difficulty to start the engine.

What is claimed is:

1. In a power steering apparatus for use in a motor car of the type including a control device for controlling a motor driven oil pump in accordance with an output of a sensor device which detects running condition of said motor car driven by an engine, the improvement which comprises means for stopping said oil pump while said engine is stopped and means for stopping said oil pump during starting of said engine.

2. A power steering apparatus for use in a motor car driven by an engine of the type including an oil pump for driving a power steering device, an electric motor driving said oil pump, and an energizing circuit of said electric motor, said apparatus comprising a first switch and a second switch which are connected in series in said motor energizing circuit, first means for opening said first switch when said engine is stopped, and a second means for opening said second switch when said engine is started.

3. A power steering apparatus according to claim 2 wherein said first means comprises means responsive to pressure of lubricant oil of said engine, and said second means comprises a key switch of said motor car.

4. A power steering apparatus according to claim 1 wherein said control device drives said pump when said sensor device detects that the car speed is lower than a predetermined value but stops said pump when said sensor device detects that said car is stopped while a steering wheel of the motor car is not operated.

5. A power steering device according to claim 4 wherein said oil pump is operated such that a steering force is suitable for a running condition when the car speed exceeds a predetermined low speed following the car stop.

6. A power steering device according to claim 4 wherein said sensor device comprises a speed sensor for producing a speed signal corresponding to the car speed, and
a steering angle sensor for generating a steering signal corresponding to a steering angle of the steering wheel.

7. A power steering device according to claim 6 wherein said steering angle sensor comprises a code disc secured to a steering shaft of the steering wheel and provided with a plurality of slots, and
a light projector and a light receiver on the opposite sides of said code disc.

8. A power steering device according to claim 4 wherein said pump is driven by a motor to which a voltage source is connected through a switch means controlled by said control device.

9. A power steering device according to claim 8 wherein said switch means comprises first and second switches connected in series between said voltage source and said motor,
states of said first and second switches being normally held in reverse,
said first switch being made closed while the car is running and the steering wheel is operated, and
said second switch being made open when the car speed exceeds said predetermined value.

10. A power steering device according to claim 9 wherein said control device comprises a first control means for generating a first control signal while either one of a steering signal and a car speed signal generated from said sensor device is received, and
a second control means for generating a second control signal to stop said pump when the car speed exceeds the predetermined value.

11. The power steering device according to claim 10 wherein said first control means comprises an OR gate circuit supplied with the steering signal and the car speed signal and a one shot circuit connected to an output of said OR gate circuit for generating the first control signal, and
said second control means comprises a frequency/voltage converter supplied with the car speed signal to produce a DC voltage corresponding to the car speed signal, and
a comparator for comparing the DC voltage with the predetermined value to generate the second control signal.

12. A power steering device according to claim 8 said switch means comprises first and second switches connected in series between said voltage source and said motor, and a third switch connected in parallel with said first switch, states of said first and third switches and said second switch being normally held in reverse, said first switch being made closed to drive said pump while the steering wheel is operated, said second switch being made open to stop said pump when the car speed exceeds said predetermined value, and said third switch being made closed to drive said pump when the car speed exceeds another predetermined value which is an extremely low speed below the former predetermined value.

13. The power steering device according to claim 12 wherein said control device comprises a first control means for continuously generating a first control signal while a steering signal is received, a second control means for generating a second control signal to stop said pump when the car speed exceeds the predetermined value, and a third control means for generating a third control signal to drive said pump when the car starts to run and the car speed exceeds said another predetermined value.

14. The power steering devie according to claim 8 which further comprises a revolution control circuit for controlling the revolution of said motor in response to the car speed.

15. The power steering device according to claim 8 wherein said switch means comprises first and second switches and said control device comprises a first control means for generating a first control signal to send it said first switch so as to drive said pump while either one of a steering signal and a car speed signal generated form said sensor device is received, and a second control means for generating a second control signal to send it said second switch so as to stop said pump when the car speed exceeds the predetermined value.

* * * * *

UNITED STATES PATENT AND TRADEMARK OFFICE
CERTIFICATE OF CORRECTION

PATENT NO. : 4,552,240
DATED : 11/12/85
INVENTOR(S) : Takeshima et al.

It is certified that error appears in the above-identified patent and that said Letters Patent is hereby corrected as shown below:

| COLUMN | LINE | DESCRIPTION |
|--------|------|-------------|
| 8 | 56 | delete "a" insert --$\underline{a}$-- |
| 8 | 58 | delete "b" insert --$\underline{b}$-- |
| 9 | 35 | delete "a" insert --$\underline{a}$-- (first occurrence) |

Signed and Sealed this

Twenty-third Day of August, 1988

*Attest:*

DONALD J. QUIGG

*Attesting Officer*     *Commissioner of Patents and Trademarks*